(No Model.)
L. DECKER & B. M. LONG.
WAGON STAKE.
No. 510,679. Patented Dec. 12, 1893.
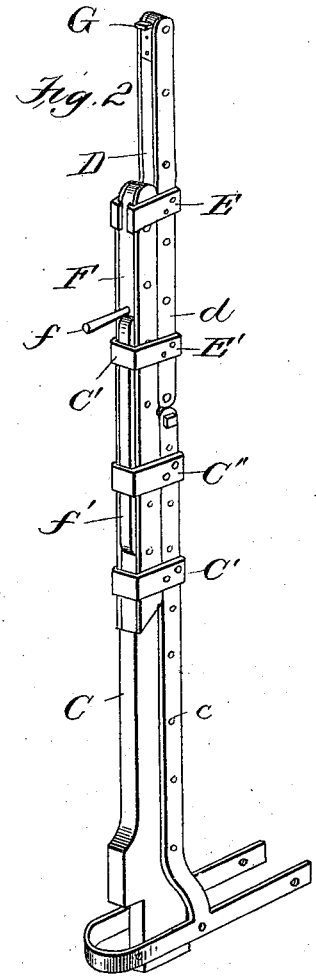
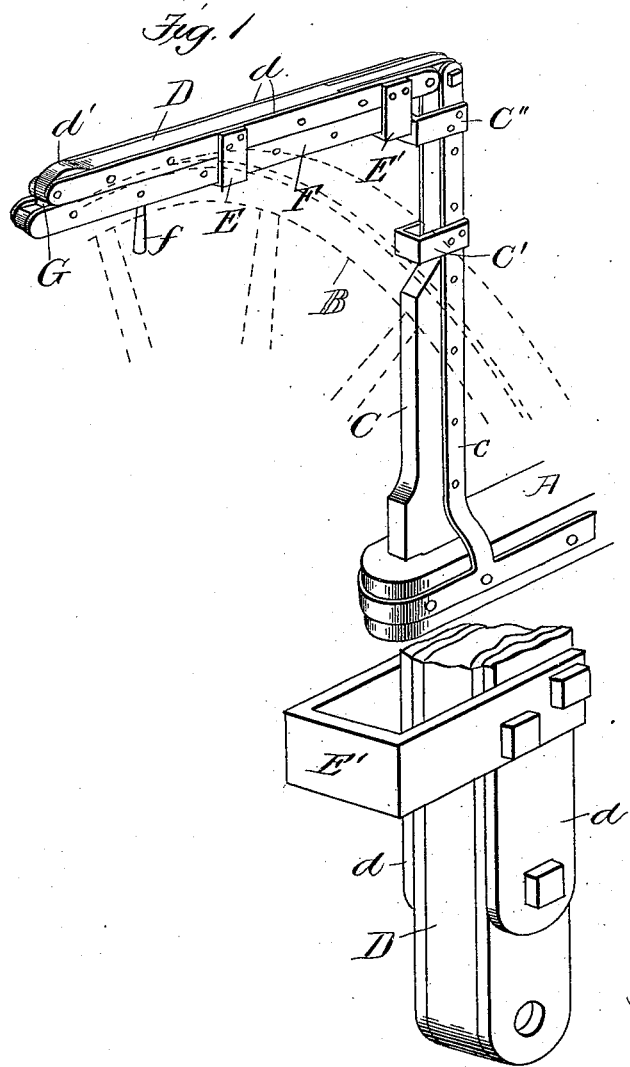
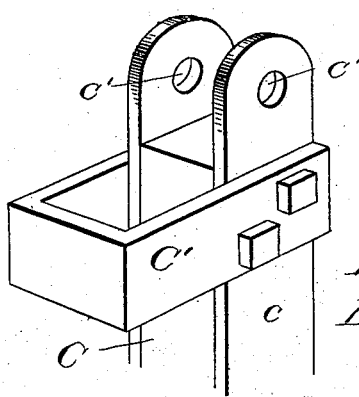
Witnesses:
F. R. Cornwall
W. M. Byrne
Inventors
Louis Decker
Benjamin M. Long
By Paul Bakewell
their atty

UNITED STATES PATENT OFFICE.

LOUIS DECKER AND BENJAMIN M. LONG, OF ST. LOUIS, MISSOURI.

WAGON-STAKE.

SPECIFICATION forming part of Letters Patent No. 510,679, dated December 12, 1893.

Application filed September 19, 1893. Serial No. 485,851. (No model.)

*To all whom it may concern:*

Be it known that we, LOUIS DECKER and BENJAMIN M. LONG, citizens of the United States, residing in the city of St. Louis, State of Missouri, have invented a certain new and useful Improvement in Wagon-Stakes, of which the following is a full, clear, and exact description, reference being had to the accompanying drawings, wherein—

Figure 1 is a perspective view of our improved stake attached to a wagon bolster, illustrating the same in a lowered position for loading or unloading the wagon. Fig. 2 is a detailed view of the stake in an upright position. Fig. 3 is an enlarged view of the pivotal connection between the pivoted and stationary members of the stake.

Our invention relates to a new and useful improvement in wagon stakes, and consists, generally stated, in forming a joint therein through the medium of which the upper pivoted member may be folded down, thus shortening the stake, and in providing the two members with suitable guide-straps which are adapted to receive a locking bolt for holding the parts in a rigid, upright position.

The invention is particularly designed for use in connection with lumber-wagons, which generally consist of a skeleton frame, the stakes being secured to the ends of the bolsters, and by folding them down, as shown in Fig. 1, in which the upper pivoted member rests upon the tire of the rear ground wheel, the distance for raising the lumber over the stake is considerably shortened, the horizontal portion of the stake, at the same time, affording a rest or support for the lumber during the work of loading or unloading.

In the drawings, A indicates a bolster, and B indicates one of the ground wheels shown in the dotted lines.

Removably, or otherwise, secured in a tenon formed in the end of the bolster, is the stationary section C of the stake, which, as shown, is materially strengthened by two straps $c$ extending along its length and provided with pivot-holes $c'$ in their upper ends, which straps at their lower ends are preferably welded to a U-shaped clamping-iron, which fits around the end of the bolster. This portion of the stake C is reduced in width at its upper ends, preferably on its outer face, over which reduced portion extend U-shaped guide-straps $C'$ into which is received the locking bolt, as shown in Fig. 2. The bottom of this reduced portion is preferably inclined correspondingly with the inclined end of the locking bolt which abuts thereagainst, the inclination of each being of such nature that when the bolt is in its locking position, it will have a tendency to wedge and bind the parts more tightly together.

Pivoted in the upper ends of the straps $c$, is the upper member of the stake D, which, for purposes of strength and durability, is faced on each side with straps $d$. The upper inner end of this pivoted member D, which is adapted to rest on the wheel, as shown in Fig. 1, is enlarged as at $d'$, the function of which enlargement is to prevent lumber from sliding off in wet weather, should the pivot point be slightly above the wheel so as to incline the pivoted member downwardly.

Mounted in guide-straps E and E' on the outer side of the pivoted member, is the locking-bolt F, provided with a handle $f$ for operating the same, for the passage of which handle beyond the strap E said strap is divided, as shown in Fig. 2. On the outer face of this locking bolt is a wearplate $f'$, which is beveled at its lower end, which beveled portion causes the uppermost strap $C''$ to tightly wedge the bolt in its lower position, in conjunction with the beveled lower end thereof, which features add rigidity to the structure.

On the upper outer face of the pivoted member D, we provide a stop G, which prevents the bolt F from being disconnected or separated therefrom. The two members are preferably connected together by a bolt and removable nut, in order that if at any time it should be desirable to detach the pivoted member, to shorten the stake, it could readily be done.

Having thus described our invention, what we claim, and desire to secure by Letters Patent, is—

1. In a wagon stake, the combination with a stationary member, having a reduced portion on its upper outer face, guide-straps extending over said portion, a swinging or folding member pivotally secured to the upper end of the stationary member, guide-straps secured to this swinging member, and a slide-bolt, mounted in said straps, which is adapted to be slid down into the guide-straps on the stationary member for holding the pivoted member in a vertical plane, substantially as described.

2. In a wagon stake, the combination with the stationary member, having a reduced upper portion, guide-straps extending over said reduced portion, a swinging member pivotally secured to the upper end of the stationary member, guide-straps mounted on said pivoted member, and a slide-bolt mounted in said guide-straps and provided with a beveled end and a wear-iron on its outer face, substantially as described.

3. In a wagon stake, the combination with a stationary member, which is adapted to be secured to the bolster, of a pivoted member attached to its upper end, which pivoted member is adapted to be folded over to rest upon the ground-wheel of the wagon, and a nub or projection on the upper outer face of the pivoted member, substantially as described.

4. In a wagon stake, the combination of a stationary member of straps extended along its sides terminating at their upper ends in pivot eyes, a swinging member pivoted in said eyes and a bolt for locking the pivoted member in a vertical plane, substantially as described.

5. In a wagon stake, the combination with a stationary member, of a swinging member pivoted thereto, a bolt for locking the swinging member in a vertical plane, and a projection G on the swinging member for preventing the displacement of said bolt, substantially as described.

In testimony whereof we hereunto affix our signatures, in presence of two witnesses, this 14th day of September, 1893.

LOUIS DECKER.
BENJAMIN M. LONG.

Witnesses:
F. R. CORNWALL,
HUGH K. WAGNER.